US011530973B1

(12) United States Patent
Guo et al.

(10) Patent No.: US 11,530,973 B1
(45) Date of Patent: Dec. 20, 2022

(54) HIGH-TEMPERATURE AND HIGH-PRESSURE EQUIPMENT AND METHOD FOR MICROSCOPIC VISUAL SULFUR DEPOSIT SEEPAGE TEST

(71) Applicant: Southwest Petroleum University, Chengdu (CN)

(72) Inventors: Xiao Guo, Chengdu (CN); Ziming Shi, Chengdu (CN); Li Zhou, Chengdu (CN); Shengyuan Wang, Chengdu (CN); Jun Luo, Chengdu (CN); Linkai Li, Chengdu (CN); Ming Zhou, Chengdu (CN); Jingjing Ma, Chengdu (CN); Li Wang, Chengdu (CN); Bing Kong, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/509,109

(22) Filed: Oct. 25, 2021

(30) Foreign Application Priority Data

Jun. 1, 2021 (CN) .......................... 202110607386.2

(51) Int. Cl.
*G01N 15/08* (2006.01)
*G01N 21/03* (2006.01)
(Continued)

(52) U.S. Cl.
CPC ........ *G01N 15/0826* (2013.01); *G01M 3/226* (2013.01); *G01N 15/04* (2013.01); *G01N 21/0303* (2013.01)

(58) Field of Classification Search
CPC ...... G01N 7/04; G01N 15/02; G01N 21/0303; G01N 21/0332; G01N 21/0317;
(Continued)

(56) References Cited

U.S. PATENT DOCUMENTS

| 11,428,620 B2 * | 8/2022 | Xiao ..................... G01N 15/088 |
| 2004/0154220 A1 | 8/2004 | Holcomb |

(Continued)

FOREIGN PATENT DOCUMENTS

| CN | 103566701 A | 2/2014 |
| CN | 104062214 B | 9/2014 |

(Continued)

*Primary Examiner* — Hoa Q Pham (57) ABSTRACT

A high-temperature and high-pressure equipment and method for microscopic visual sulfur deposit seepage test is provided by the present disclosure, the equipment comprises an injection system, a high-temperature and high-pressure visual kettle, a pressure supply system, a data acquisition and analysis system, a fluid recovery system, and an injection branch pipe; the injection system comprises an ISCo micro-injection pump, an intermediate container, a thermostatic heating oven and a pressure meter; the intermediate container is arranged in the thermostatic heating oven, the ISCo micro-injection pump is connected to the intermediate container; the data acquisition and analysis system comprises a microscope, a high-brightness light source and a computer; the pressure supply system comprises an annular pressure tracking pump, a back pressure pump, a back pressure valve and a pressure gauge; the fluid recovery system comprises a wide neck flask with rubber stopper, a balance, a flowmeter and an exhaust gas absorber tank.

10 Claims, 3 Drawing Sheets

(51) Int. Cl.
*G01M 3/22* (2006.01)
*G01N 15/04* (2006.01)

(58) Field of Classification Search
CPC ............ G01N 21/51; G01N 2021/4707; C01B 17/02; C01B 17/0248; G02B 21/24
USPC .................................................. 356/432–440
See application file for complete search history.

(56) References Cited

U.S. PATENT DOCUMENTS

2020/0284725 A1* 9/2020 Zhao .................. G01N 21/0317
2020/0333241 A1* 10/2020 Zhao .................. G01N 21/0303
2021/0208051 A1* 7/2021 Ju .......................... B33Y 50/02

FOREIGN PATENT DOCUMENTS

| CN | 106153393 A | 11/2016 |
| CN | 106437637 B | * 12/2018 |
| CN | 109060616 B | 12/2018 |
| CN | 113433050 A | 9/2021 |

* cited by examiner

HIGH-TEMPERATURE AND HIGH-PRESSURE EQUIPMENT AND METHOD FOR MICROSCOPIC VISUAL SULFUR DEPOSIT SEEPAGE TEST

CROSS-REFERENCE TO RELATED APPLICATIONS

The application claims priority to Chinese patent application No. 202110607386.2, filed on Jun. 1, 2021, the entire contents of which are incorporated herein by reference.

TECHNICAL FIELD

The present disclosure relates to the technical field of hydrocarbon reservoir exploitation research, and specifically to a high-temperature and high-pressure equipment and method for microscopic visual sulfur deposit seepage test, which is suitable for the experimental study of microscopic sulfur deposit seepage in high-sulfur-bearing gas reservoirs under simulated formation conditions.

BACKGROUND

High-sulfur-bearing gas reservoir is a special type of sour gas reservoir that is mainly characterized by deep burial depth, high hydrogen sulfide content and great geothermal gradient. Hydrogen sulfide is an important industrial raw material with high economic value, but the hydrogen sulfide existing in natural gas exposes a detrimental effect on the exploration, development and utilization of natural gas. In the process of exploitation, with the decrease of pressure and temperature, the solubility of sulfur in sour gas decreases, and elemental sulfur precipitates out. Some of them migrate with the gas flow and some of them are deposited in the formation, blocking the seepage channel of natural gas and reducing the formation permeability, evening forming sulfur plugging in serious cases, which seriously affects the productivity of gas wells in high-sulfur-bearing gas reservoirs.

At present, there are many microscopic seepage test devices and methods, but the microscopic seepage tests on high-sulfur-bearing gas are only involved in the evaluation of the sulfur deposit rate from the perspective of damage to formation permeability, but rarely related to visually observation of the sulfur deposition process. Moreover, the conventional microscopic seepage devices do not consider the risk of sulfur, the heating of the microscopic seepage test devices is uncontrollable, and the observation of seepage process and the control and detection of pressure and flow rate are not accurate sufficiently.

SUMMARY

The purpose of the present disclosure is to overcome the shortcomings of the prior art and provide a high-temperature and high-pressure equipment and method for microscopic visual sulfur deposit seepage test. The equipment is simple in structure and safe in operation, and can monitor the seepage process in real time to obtain the curve on the relationship between the sulfur deposit rate and the effective stress, and study the microscopic pore distribution and the microscopic sulfur deposit rate.

The purpose of the present disclosure is achieved through the following technical solutions:

a high-temperature and high-pressure equipment for microscopic visual sulfur deposit seepage test, comprising an injection system, a high-temperature and high-pressure visual kettle, a pressure supply system, a data acquisition and analysis system, a fluid recovery system, and an injection branch pipe; the injection system comprises an ISCo micro-injection pump, an intermediate container, a thermostatic heating oven and a pressure meter; the intermediate container is arranged in the thermostatic heating oven, the ISCo micro-injection pump is connected to the intermediate container, and the pressure meter is set on the pipe between the ISCo micro-injection pump and the intermediate container; the data acquisition and analysis system comprises a microscope, a high-brightness light source and a computer; the pressure supply system comprises an annular pressure tracking pump, a back pressure pump, a back pressure valve and a pressure gauge; the fluid recovery system comprises a wide neck flask with rubber stopper, a balance, a flowmeter and an exhaust gas absorber tank; the ISCo micro-injection pump, intermediate container, annular pressure tracking pump, high-temperature and high-pressure visual kettle, back pressure pump, back pressure valve, pressure gauge, wide neck flask with rubber stopper, flowmeter and exhaust gas absorber tank are connected via the injection branch pipe; the thermostatic heating oven, microscope, high-brightness light source and balance are connected to the computer by a data transmission line, respectively.

Specifically, the intermediate container comprises a first intermediate container and a second intermediate container; one ends of the first intermediate container and the second intermediate container are respectively connected to the ISCo micro-injection pump, and the other ends are respectively connected to the high-temperature and high-pressure visual kettle via a pipe; the test fluid in the intermediate container is first heated to the temperature required for the microscopic visual deposit seepage test by the thermostatic heating oven, and injected into the seepage test sample in the high-temperature and high-pressure visual kettle via the pipe under the pressure and at the flow rate both generated by the ISCo micro-injection pump as required for the test.

Specifically, the microscope is set above the high-temperature and high-pressure visual kettle and the lens of the microscope is aligned with the seepage test sample at the core slice holder in the kettle; the high-brightness light source is an LED lamp, located below the lens of the microscope and above the high-temperature and high-pressure visual kettle.

Specifically, the high-temperature and high-pressure visual kettle comprises an internal thermal conductive cylinder, an external insulated cylinder, a thermostat and a core slice holder; the internal thermal conductive cylinder is set inside the external insulated cylinder, a resistive heater is provided between the internal thermal conductive cylinder and the external insulated cylinder, and connected to the thermostat via a data transmission line; the core slice holder is fixed inside the internal thermal conductive cylinder during microscopic deposit seepage test, and is used to hold the seepage test sample.

Specifically, the inlet of the core slice holder is connected with the intermediate container through the injection branch pipe, and the outlet of the core slice holder is connected with a back pressure valve through a pipeline.

Specifically, the supply system comprises an annular pressure tracking pump, a back pressure pump, a back pressure valve and a pressure gauge, wherein the annular pressure tracking pump is connected to the high-temperature and high-pressure visual kettle via a pipeline and used to provide annular pressure for the high-temperature and high-pressure visual kettle; the back pressure pump is connected to the back pressure valve and used to provide back pressure for high-temperature and high-pressure visual kettle; the pressure gauge is set on the pipe between the back pressure valve and the high-temperature and high-pressure visual kettle and used to collect the back pressure.

Specifically, the fluid recovery system further comprises a hydrogen sulfide gas monitor and a fume hood; the wide neck flask with rubber stopper is set on the balance, the inlet of the wide neck flask with rubber stopper is connected with the back pressure valve, and the outlet of the wide neck flask with rubber stopper is connected with the exhaust gas absorber tank via the flow meter; the hydrogen sulfide gas monitor is connected with the computer and is placed above the exhaust gas absorber tank.

A visual seepage test method with the high-temperature and high-pressure equipment for microscopic visual sulfur deposit seepage test, comprising the following steps: recording images in the seepage test with a microscope, and analyzing the rock particles, pore structure, micro-seepage of sulfur deposits on the observed plane at different depth in the seepage test by means of image reconstruction processing method; firstly putting the seepage test sample into the high-temperature and high-pressure visual kettle, connecting the pipes, then heating the high-temperature and high-pressure visual kettle to the required test temperature by the thermostat, establishing annular pressure and back pressure, and starting the ISCo micro-injection pump to pump the liquid sulfur in the intermediate container into the seepage test sample at a certain pressure and flow rate;

clicking and transmitting the command "Start Recording" on the computer to the microscope via the data transmission line, starting taking photos, next transmitting the photos to the computer in real time via the data transmission line for analysis and processing, obtaining the curve on the relationship between the sulfur deposit rate and the effective stress, and studying the microscopic pore distribution and the microscopic sulfur deposit rate.

Specifically, the method comprises the following steps:

S1: putting the core slice holder with seepage test sample into the high-temperature and high-pressure visual kettle and fix it, setting the temperature to 115° C. on the thermostat, opening the valve G after the temperature in the kettle rises to 93° C., setting the pressure of the annular pressure tracking pump to 29 MPa to establish an annular pressure while opening the balance and the hydrogen sulfide gas monitor at the same time, then opening the valve F, and setting the pressure of back pressure pump to 35 MPa to establish a back pressure;

S2: turning on the high-brightness light source (i.e., the LED lamp) and the microscope, and adjusting the focal length of the microscope until the seepage test sample on the computer is clearly visible and meets the preset definition requirements of the test;

S3: opening the thermostatic heating oven and set the temperature to 115° C., heating the fluid in the first intermediate container and the second intermediate container to 115° C., and then keep it at a constant temperature;

S4: setting the flow rate of the ISCO micro-injection pump to 0.1 ml/min, opening the valve A, valve C and valve D, pressing the "Start" button of the ISCO micro-injection pump to inject the liquid sulfur in the first intermediate container into the core slice holder;

S5: clicking "Start Recording" on the computer to store the real-time recorded images on the computer, monitor the fluid change and sulfur distribution in the core slice holder in real time through the screen of the computer, pressing the "Pause" button on the ISCO micro-injection pump to stop injection when it is observed that there is basically no change in the images acquired by the computer and the fluid volume in the wide neck flask with rubber stopper is 2 PV, and then safely disposing of the liquid sulfur in the wide neck flask with rubber stopper;

S6: first closing the valve C and valve D, then opening the valve B and valve E, then setting a constant speed for the ISCO micro-injection pump for displacement, setting the displacement speed to 0.1 mL/min, pressing the "Start" button to inject carbon dioxide gas containing sulfur powder, programing with VB language whenever the image observed by the microscope changes once, and storing the real-time saved images in the computer, and monitoring the sulfur deposit pattern through the screen of the computer; pressing the "Pause" button on the ISCo micro-injection pump to stop injection when it is observed that there is basically no change in the images acquired by the computer and no further change in the balance;

S7: closing all valves, turn off the high-brightness light source (i.e., the LED lamp), the back pressure pump and the annular pressure tracking pump, removing the core slice holder, and cleaning each device; safely disposing of the fluid in the wide neck flask with rubber stopper and the gas in the exhaust gas absorber tank; the microscopic visual sulfur deposit seepage test at high temperature and high pressure is completed Specifically, the physical parameters of the seepage test sample in the seepage process include the microscopic morphology and deposit rate of sulfur deposit.

The present disclosure has the following beneficial effects:

1. It is simple and easy for the equipment proposed in the present disclosure to prepare seepage test samples, control the pressure and flow rate of the fluid with the micro-injection pump, the equipment applies to single-phase seepage test but also multi-phase seepage test, adapts to the requirements of different seepage test on the equipment, and at the end of the test, the waste fluid is recovered by an exhaust gas absorber tank and a waste fluid pool for central treatment, which is safe and environment-friendly. The test equipment is controlled by a computer, and the test data can be processed by image reconstruction technology to analyze the rock particles, pore structure, micro-seepage of sulfur deposits on the observed plane at different depth in the seepage test.

2. Compared with the existing devices and methods, the high-temperature and high-pressure equipment and method for microscopic visual sulfur deposit seepage test proposed in the present disclosure make it possible to directly observe the sulfur deposition of sulfur-containing gas under different conditions through the microscope, and perform macro-to-microscopic sulfur deposit seepage tests to obtain the deposition pattern of sulfur-containing gas under different temperature and pressure conditions, solving the issue that the test process cannot be monitored in real time by the existing sulfur deposit seepage test equipment, which is of guiding significance to the efficient development of high-sulfur-bearing gas reservoirs.

DETAILED DESCRIPTION OF THE EMBODIMENTS

In order to have a clearer understanding of the technical characteristics, purposes and effects of the present disclosure, the preferred embodiments of the present disclosure are described in details with reference to the brief description of the drawings.

Figure 1:
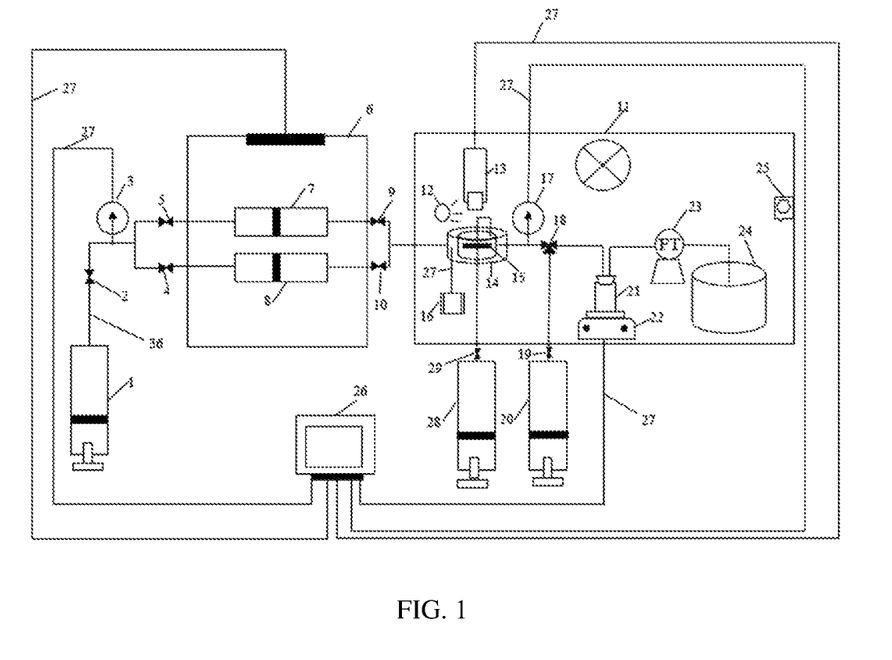
FIG. 1 is a schematic diagram of the high-temperature and high-pressure equipment for microscopic visual sulfur deposit seepage test.
Figure 2:
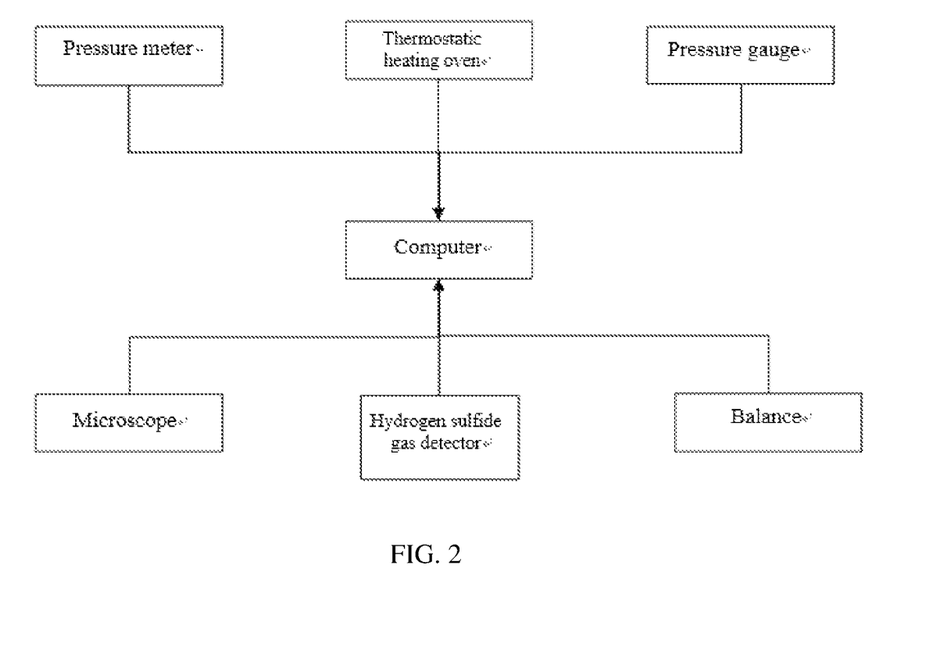
FIG. 2 is a schematic diagram of the electrical structure of the high-temperature and high-pressure equipment for microscopic visual sulfur deposit seepage test in the present disclosure.

In the embodiments, as shown in FIG. 1 and FIG. 2, a high-temperature and high-pressure equipment for microscopic visual sulfur deposit seepage test, comprising an injection system, a high-temperature and high-pressure visual kettle (14), a pressure supply system, a data acquisition and analysis system, a fluid recovery system, and an injection branch pipe (36); the injection system comprises an ISCo micro-injection pump (1), an intermediate container, a thermostatic heating oven (6) and a pressure meter (3); the intermediate container is arranged in the thermostatic heating oven (6), the ISCo micro-injection pump (1) is connected to the intermediate container, and the pressure meter (3) is set on the pipe between the ISCo micro-injection pump (1) and the intermediate container; the data acquisition and analysis system comprises a microscope (13), a high-brightness light source and a computer (26); the pressure supply system comprises an annular pressure tracking pump (28), a back pressure pump (20), a back pressure valve (18) and a pressure gauge (17); the fluid recovery system comprises a wide neck flask with rubber stopper (21), a balance (22), a flowmeter (23) and an exhaust gas absorber tank (24); the injection branch pipe (36) is used to connect the ISCo micro-injection pump (1), the intermediate container, the annular pressure tracking pump (28), the high-temperature and high-pressure visual kettle (14), the back pressure pump (20), the back pressure valve (18), the pressure gauge (17), the wide neck flask with rubber stopper (21), the flowmeter (23), and the exhaust gas absorber tank (24); the thermostatic heating oven (6), microscope (13), high-brightness light source and balance (22) are connected to the computer (26) by a data transmission line (27), respectively.

Specifically, the intermediate container comprises a first intermediate container (7) and a second intermediate container (8); one ends of the first intermediate container (7) and the second intermediate container (8) are respectively connected to the ISCo micro-injection pump (1), and the other ends are respectively connected to the high-temperature and high-pressure visual kettle (14) via a pipe; the test fluid in the intermediate container is first heated to the temperature required for the microscopic visual deposit seepage test by the thermostatic heating oven (6), and injected into the seepage test sample in the high-temperature and high-pressure visual kettle (14) via the pipe under the pressure and at the flow rate both generated by the ISCo micro-injection pump (1) as required for the test.

Specifically, the microscope (13) is set above the high-temperature and high-pressure visual kettle (14) and the lens of the microscope (13) is aligned with the seepage test sample at the core slice holder (15) in the kettle; the high-brightness light source is an LED lamp, located below the lens of the microscope (13) and above the high-temperature and high-pressure visual kettle (14).

Specifically, the microscope (13) is set above the high-temperature and high-pressure visual kettle (14) and the lens of the microscope (13) is aligned with the seepage test sample at the core slice holder (15) in the kettle; the high-brightness light source is an LED lamp, located below the lens of the microscope (13) and above the high-temperature and high-pressure visual kettle (14).

Specifically, the inlet of the core slice holder (15) is connected with the intermediate container through the injection branch pipe (36), and the outlet of the core slice holder is connected with a back pressure valve (18) through a pipeline.

Specifically, the supply system comprises an annular pressure tracking pump (28), a back pressure pump (20), a back pressure valve (18) and a pressure gauge (17), wherein the annular pressure tracking pump (28) is connected to the high-temperature and high-pressure visual kettle (14) via a pipeline and used to provide annular pressure for the high-temperature and high-pressure visual kettle (14); the back pressure pump (20) is connected to the back pressure valve (18) and used to provide back pressure for high-temperature and high-pressure visual kettle (14); the pressure gauge (17) is set on the pipe between the back pressure valve (18) and the high-temperature and high-pressure visual kettle (14) and used to collect the back pressure.

Specifically, the fluid recovery system further comprises a hydrogen sulfide gas monitor (25) and a fume hood (11); the wide neck flask with rubber stopper (21) is set on the balance (22), the inlet of the wide neck flask with rubber stopper (21) is connected with the back pressure valve (18), and the outlet of the wide neck flask with rubber stopper (21) is connected with the exhaust gas absorber tank (24) via the flow meter (23); the hydrogen sulfide gas monitor (25) is connected with the computer (26) and is placed above the exhaust gas absorber tank (24).

In addition, the test equipment is also provided with various valves including valve A (2), valve B (4), valve C (5), valve D (9), valve E (10), valve F (19), valve G (29), valve H (32), valve I (33), and valve J (34).

provided with valves A2, B4, C5, D9, E10, F19, G29, H32, I33 and J34.

Among them, the computer (26) is a laboratory-dedicated computer, and connected with the pressure meter (3), the thermostatic heating oven (6), the microscope (13), the pressure gauge (17) and the balance (22) with the data transmission line (27) respectively so as to centrally control the devices and acquire the data. The first intermediate container (7) and the second intermediate container (8) are set in the thermostatic heating oven (6), the high-temperature and high-pressure visual kettle (14), the pressure gauge (17), the back pressure valve (18), the wide neck flask with rubber stopper (21), the flowmeter (23) and the exhaust gas absorber tank (24) are set in the fume hood (11), and successively connected together from left to right with the injection branch pipe (36), and the hydrogen sulfide gas monitor (25) is set above the exhaust gas absorber tank (24). The annular pressure tracking pump (28) is connected to the upper right of the high-temperature and high-pressure visual kettle (14) with the injection branch pipe (36), and the back pressure pump (20) is connected between the pressure gauge (17) and the wide neck flask with rubber stopper (21) through the back pressure valve (18).

The injection branch pipe (36) is a Hastelloy pipe with resistance against acid and alkali corrosion; the pressure meter (3) and pressure gauge (17) are precision digital pressure gauge with wide application range and simple operation; the core slice holder (15) requires that the seepage test sample is 45 mm long, 45 mm wide and 3 mm thick; the ISCO micro-injection pump (1) is used to generate a pressure and flow rate as required for the test after all devices are connected; the fluid in the first intermediate container (7) or the second intermediate container (8) flows into the seepage sample in the core slice holder (15) through the injection branch pipe (36), and then successively flows into the wide neck flask with rubber stopper (21) on the right, the flowmeter (23) and the exhaust gas absorber tank (24) for recovery treatment; after the fluid enters the core slice holder (15), images and data are acquired by the computer (26).

Figure 3:
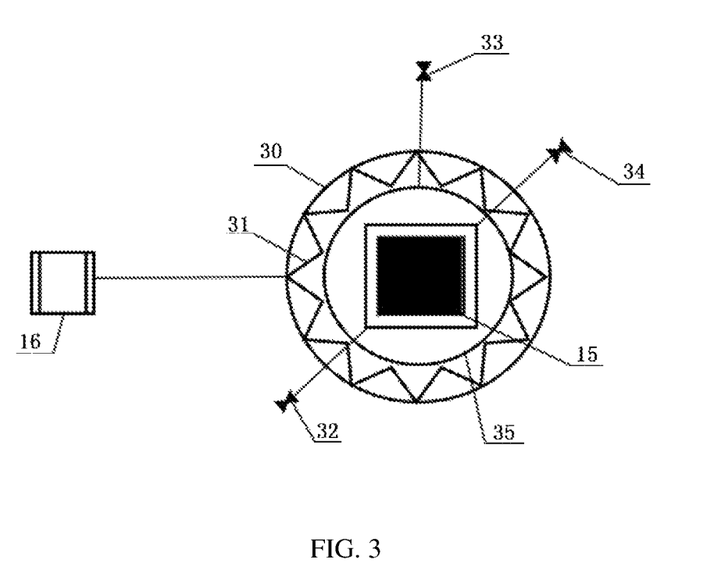
FIG. 3 is a schematic diagram of the structure of the high-temperature and high-pressure visual kettle.

The high-temperature and high-pressure method for microscopic visual sulfur deposit seepage of the present disclosure comprises the following steps:

1. Putting the core slice holder (15) with seepage test sample into the high-temperature and high-pressure visual kettle (14) and fix it, setting the temperature to 115° C. on the thermostat (16), opening the valve G (29) after the temperature in the kettle rises to 93° C., setting the pressure of the annular pressure tracking pump (28) to 29 MPa to establish an annular pressure while opening the balance (22) and the hydrogen sulfide gas monitor (25) at the same time, then opening the valve F (19), and setting the pressure of back pressure pump (20) to 35 MPa to establish a back pressure.

2. Turning on the high-brightness light source (i.e., the LED lamp (12)) and the microscope (13), and adjusting the focal length of the microscope (13) until the seepage test sample on the computer (26) is clearly visible.

3. Opening the thermostatic heating oven (6) and setting the temperature to 115° C., heat the fluid in the first intermediate container (7) and the second intermediate container (8) to 115° C., and then keeping it at a constant temperature.

4. Setting the flow rate of the ISCO micro-injection pump (1) to 0.1 ml/min, opening the valve A (2), valve C (5) and valve D (9), pressing the "Start" button of the ISCO micro-injection pump (1) to inject the liquid sulfur in the first intermediate container (7) into the core slice holder (15).

5. Clicking "Start Recording" on the computer (26) to store the real-time recorded images on the computer (26), monitor the fluid change and sulfur distribution in the core slice holder (15) in real time through the screen of the computer (26), pressing the "Pause" button on the ISCO micro-injection pump (1) to stop injection when it is observed that there is basically no change in the images acquired by the computer (26) and the fluid volume in the wide neck flask with rubber stopper (21) is 2 PV, and then safely disposing of the liquid sulfur in the wide neck flask with rubber stopper (21).

6. First closing the valve C (5) and valve D (9), then opening the valve B (4) and valve E (10), then setting a constant speed for the ISCO micro-injection pump (1) for displacement, setting the displacement speed to 0.1 mL/min, pressing the "Start" button to inject carbon dioxide gas containing sulfur powder, programing with VB language whenever the image observed by the microscope (13) changes once, and store the real-time saved images in the computer (26), and monitoring the sulfur deposit pattern through the screen of the computer (26); pressing the "Pause" button on the ISCo micro-injection pump (1) to stop injection when it is observed that there is basically no change in the images acquired by the computer (26) and no further change in the balance (22).

7. Closing all valves, turning off the high-brightness light source (i.e., the LED lamp (12)), the back pressure pump (20) and the annular pressure tracking pump (28), removing the core slice holder (15), and cleaning each device; safely disposing of the fluid in the wide neck flask with rubber stopper (21) and the gas in the exhaust gas absorber tank (24); the microscopic visual sulfur deposit seepage test at high temperature and high pressure is completed.

FIG. 3 is a schematic diagram of the structure of the high-temperature and high-pressure visual kettle. The high-temperature and high-pressure visual kettle (14) comprises an internal thermal conductive cylinder (35), an external insulated cylinder (30), a thermostat (16) and a core slice holder (15); the internal thermal conductive cylinder (35) is set inside the external insulated cylinder (30), a resistive heater (31) is provided between the internal thermal conductive cylinder (35) and the external insulated cylinder (30), and connected to the thermostat (16) via a data transmission line (27). The core slice holder (15) is fixed inside the internal thermal conductive cylinder (35) during microscopic deposit seepage test, and is used to hold the seepage test sample.

Specifically, inlet of the core slice holder (15) is connected with the intermediate container through the injection branch pipe (36), and outlet of the core slice holder (15) is connected with a back pressure valve (18) through a pipeline.

The present disclosure discloses a high-temperature and high-pressure equipment and method for microscopic visual sulfur deposit seepage test, mainly consisting of an ISCo micro-injection pump (1), an intermediate container, a thermostatic heating oven (6), a high-temperature and high-pressure visual kettle (14), a microscope (13), a fume hood (11) and so on. The fluid in the intermediate container is heated to the temperature required for the test by the thermostatic heating oven (6), and flows into the seepage test sample via the pipe under the pressure and at the flow rate both generated by the ISCo micro-injection pump (1) as required for the test. The seepage test sample is placed in the high-temperature and high-pressure visual kettle (14), the fluid morphology and the sulfur deposit content inside the seepage test sample can be observed through the microscope (13) that is set above the high-temperature and high-pressure visual kettle (14), and the images and other data are acquired and loaded to the computer through the data transmission line (27). The present disclosure addresses the issue that the microscopic morphology and deposit rate of sulfur at the core throat cannot be observed in real time in the previous microscopic seepage test of sulfur deposit. The basic principles, main characteristics and advantages of the present disclosure are shown and described above. It should be understood by those skilled in the art that the present disclosure is not limited by the above embodiments, that the above embodiments and the description described in the Disclosure only illustrate the principles of the present disclosure, and that there will be various variations and improvements to the present disclosure without departing from the spirit and scope of the present disclosure, all of which fall within the scope of the present disclosure for which protection is claimed. The scope of the protection claimed for the present disclosure is defined by the appended Claims and their equivalents.

What is claimed is:

1. A high-temperature and high-pressure equipment for microscopic visual sulfur deposit seepage test, comprising an injection system, a high-temperature and high-pressure visual kettle, a pressure supply system, a data acquisition and analysis system, a fluid recovery system, and an injection branch pipe, wherein the injection system, high-temperature and high-pressure visual kettle, pressure supply system, and fluid recovery system are connected in sequence by pipes; the injection system comprises an ISCo micro-injection pump, an intermediate container, a thermostatic heating oven and a pressure meter; the intermediate container is arranged in the thermostatic heating oven, the ISCo micro-injection pump is connected to the intermediate container, and the pressure meter is set on the pipe between the ISCo micro-injection pump and the intermediate container; the data acquisition and analysis system comprises a microscope, a high-brightness light source and a computer; the pressure supply system comprises an annular pressure tracking pump, a back pressure pump, a back pressure valve and a pressure gauge; the fluid recovery system comprises a wide neck flask with rubber stopper, a balance, a flowmeter and an exhaust gas absorber tank; the thermostatic heating oven, microscope, high-brightness light source and balance are connected to the computer by a data transmission line, respectively.

2. The high-temperature and high-pressure equipment for microscopic visual sulfur deposit seepage test according to claim 1, wherein the intermediate container comprises a first intermediate container and a second intermediate container; one ends of the first intermediate container and the second intermediate container are respectively connected to the ISCo micro-injection pump, and the other ends are respectively connected to the high-temperature and high-pressure visual kettle via a pipe; the test fluid in the intermediate container is first heated to the temperature required for the microscopic visual deposit seepage test by the thermostatic heating oven, and injected into the seepage test sample in the high-temperature and high-pressure visual kettle via the pipe under the pressure and at the flow rate both generated by the ISCo micro-injection pump as required for the test.

3. A high-temperature and high-pressure method for microscopic visual sulfur deposit seepage test according to claim 2, comprising the following steps:

S1: putting the core slice holder with seepage test sample into the high-temperature and high-pressure visual kettle and fix it, setting the temperature to 115° C. on the thermostat, opening the valve G after the temperature in the kettle rises to 93° C., setting the pressure of the annular pressure tracking pump to 29 MPa to establish an annular pressure while opening the balance and the hydrogen sulfide gas monitor at the same time, then opening the valve F, and setting the pressure of back pressure pump to 35 MPa to establish a back pressure;

S2: turning on the high-brightness light source and the microscope, and adjusting the focal length of the microscope until the seepage test sample on the computer is clearly visible and meets the preset definition requirements of the test;

S3: opening the thermostatic heating oven and setting the temperature to 115° C., heating the fluid in the first intermediate container and the second intermediate container to 115° C., and then keeping it at a constant temperature;

S4: setting the flow rate of the ISCO micro-injection pump to 0.1 ml/min, opening the valve A, valve C and valve D, pressing the "Start" button of the ISCO micro-injection pump to inject the liquid sulfur in the first intermediate container into the core slice holder;

S5: clicking "Start Recording" on the computer to store the real-time recorded images on the computer, monitoring the fluid change and sulfur distribution in the core slice holder in real time through the screen of the computer, pressing the "Pause" button on the ISCo micro-injection pump to stop injection when it is observed that there is basically no change in the images acquired by the computer and the fluid volume in the wide neck flask with rubber stopper is 2 PV, and then safely disposing of the liquid sulfur in the wide neck flask with rubber stopper;

S6: first closing the valve C and valve D, then open the valve B and valve E, then setting a constant speed for the ISCO micro-injection pump for displacement, setting the displacement speed to 0.1 mL/min, pressing the "Start" button to inject carbon dioxide gas containing sulfur powder, programming with VB language whenever the image observed by the microscope changes once, and storing the real-time saved images in the computer, and monitoring the sulfur deposit pattern through the screen of the computer; pressing the "Pause" button on the ISCo micro-injection pump to stop injection when it is observed that there is basically no change in the images acquired by the computer and no further change in the balance; and S7: closing all valves, turn off the high-brightness light source, the back pressure pump and the annular pressure tracking pump, removing the core slice holder, and cleaning each device; safely disposing of the fluid in the wide neck flask with rubber stopper and the gas in the exhaust gas absorber tank; the microscopic visual sulfur deposit seepage test at high temperature and high pressure is completed.

4. The high-temperature and high-pressure equipment for microscopic visual sulfur deposit seepage test according to claim 1, wherein the microscope is set above the high-temperature and high-pressure visual kettle and the lens of the microscope is aligned with the seepage test sample at the core slice holder in the kettle; the high-brightness light source is an LED lamp, located below the lens of the microscope and above the high-temperature and high-pressure visual kettle.

5. The high-temperature and high-pressure equipment for microscopic visual sulfur deposit seepage test according to claim 1, wherein the high-temperature and high-pressure visual kettle comprises an internal thermal conductive cylinder, an external insulated cylinder, a thermostat and a core slice holder; the internal thermal conductive cylinder is set inside the external insulated cylinder, a resistive heater is provided between the internal thermal conductive cylinder and the external insulated cylinder, and connected to the thermostat via a data transmission line; the core slice holder is fixed inside the internal thermal conductive cylinder during microscopic deposit seepage test, and is used to hold the seepage test sample.

6. The high-temperature and high-pressure equipment for microscopic visual sulfur deposit seepage test according to claim 5, wherein an inlet of the core slice holder [15] is connected with the intermediate container through the injection branch pipe [36], and an outlet of the core slice holder is connected with a back pressure valve through a pipeline.

7. The high-temperature and high-pressure equipment for microscopic visual sulfur deposit seepage test according to claim 1, wherein the supply system comprises an annular pressure tracking pump, a back pressure pump, a back pressure valve and a pressure gauge, wherein the annular pressure tracking pump is connected to the high-temperature and high-pressure visual kettle via a pipeline and used to provide annular pressure for the high-temperature and high-pressure visual kettle; the back pressure pump is connected to the back pressure valve and used to provide back pressure for high-temperature and high-pressure visual kettle; the pressure gauge is set on the pipe between the back pressure valve and the high-temperature and high-pressure visual kettle and used to collect the back pressure.

8. The high-temperature and high-pressure equipment for microscopic visual sulfur deposit seepage test according to claim 1, wherein the fluid recovery system further comprises a hydrogen sulfide gas monitor and a fume hood; the wide neck flask with rubber stopper is set on the balance, an inlet of the wide neck flask with rubber stopper is connected with the back pressure valve, and the outlet of the wide neck flask with rubber stopper is connected with the exhaust gas absorber tank via the flow meter; the hydrogen sulfide gas monitor is connected with the computer and is placed above the exhaust gas absorber tank.

9. A visual seepage test method with the high-temperature and high-pressure equipment for microscopic visual sulfur deposit seepage test according to any one of claim 1, comprising the following steps: record images in the seepage test with a microscope, and analyze the rock particles, pore structure, micro-seepage of sulfur deposits on the observed plane at different depth in the seepage test by means of image reconstruction processing method; firstly put the seepage test sample into the high-temperature and high-pressure visual kettle, connect the pipes, then heat the high-temperature and high-pressure visual kettle to the required test temperature by the thermostat, establish annular pressure and back pressure, and start the ISCo micro-injection pump to pump the liquid sulfur in the intermediate container into the seepage test sample at a certain pressure and flow rate; click and transmit the command "Start Recording" on the computer to the microscope via the data transmission line, start taking photos, next transmit the photos to the computer in real time via the data transmission line for analysis and processing, obtain the curve on the relationship between the sulfur deposit rate and the effective stress, and study the microscopic pore distribution and the microscopic sulfur deposit rate.

10. The method of using the high-temperature and high-pressure equipment for microscopic visual sulfur deposit seepage test according to claim 9, wherein physical parameters of the seepage test sample in the seepage process include a microscopic morphology and deposit rate of sulfur deposit.

* * * * *